Feb. 28, 1950 W. FRASER 2,498,801
TRANSVERSELY MOVABLE PISTON TYPE HYDRAULIC COUPLING
Filed Sept. 16, 1944 2 Sheets-Sheet 1
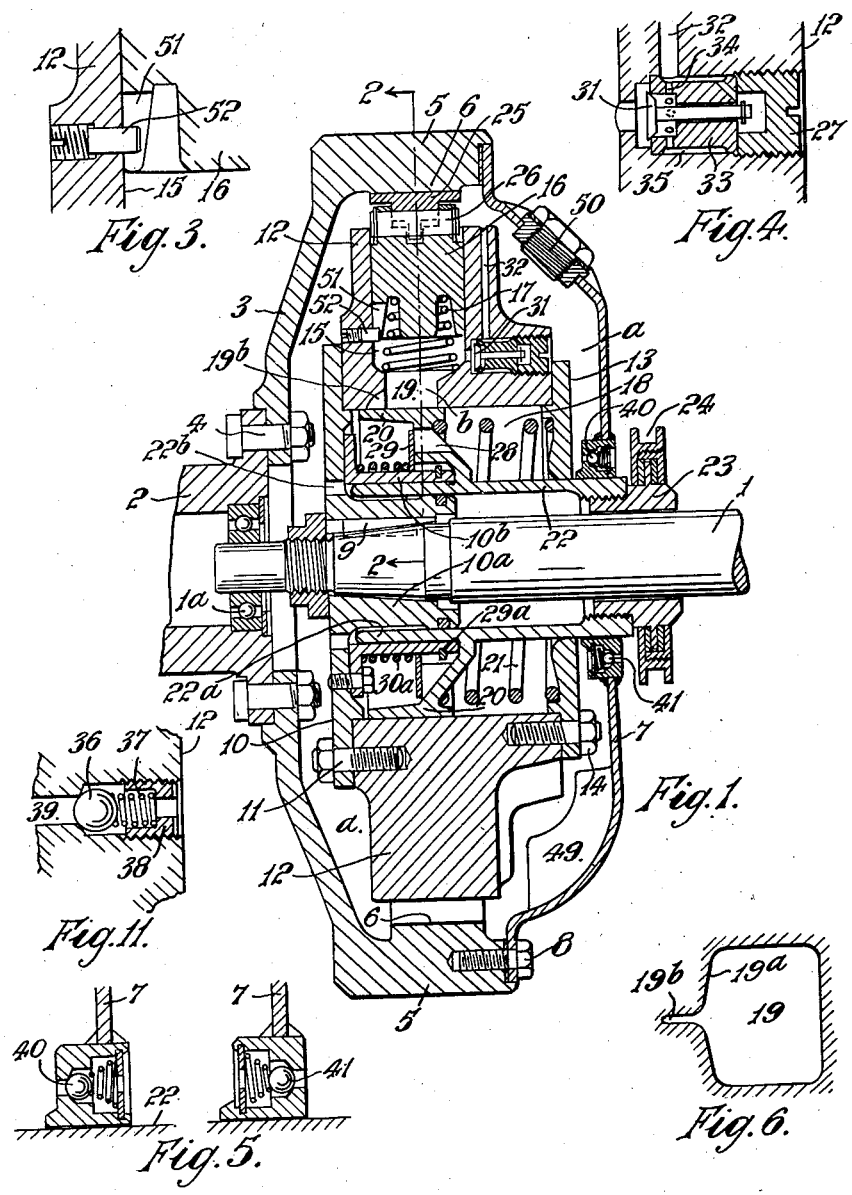
Inventor,
William Fraser
By Young, Emery & Thompson
Attys.

Feb. 28, 1950 W. FRASER 2,498,801
TRANSVERSELY MOVABLE PISTON TYPE HYDRAULIC COUPLING
Filed Sept. 16, 1944      2 Sheets-Sheet 2
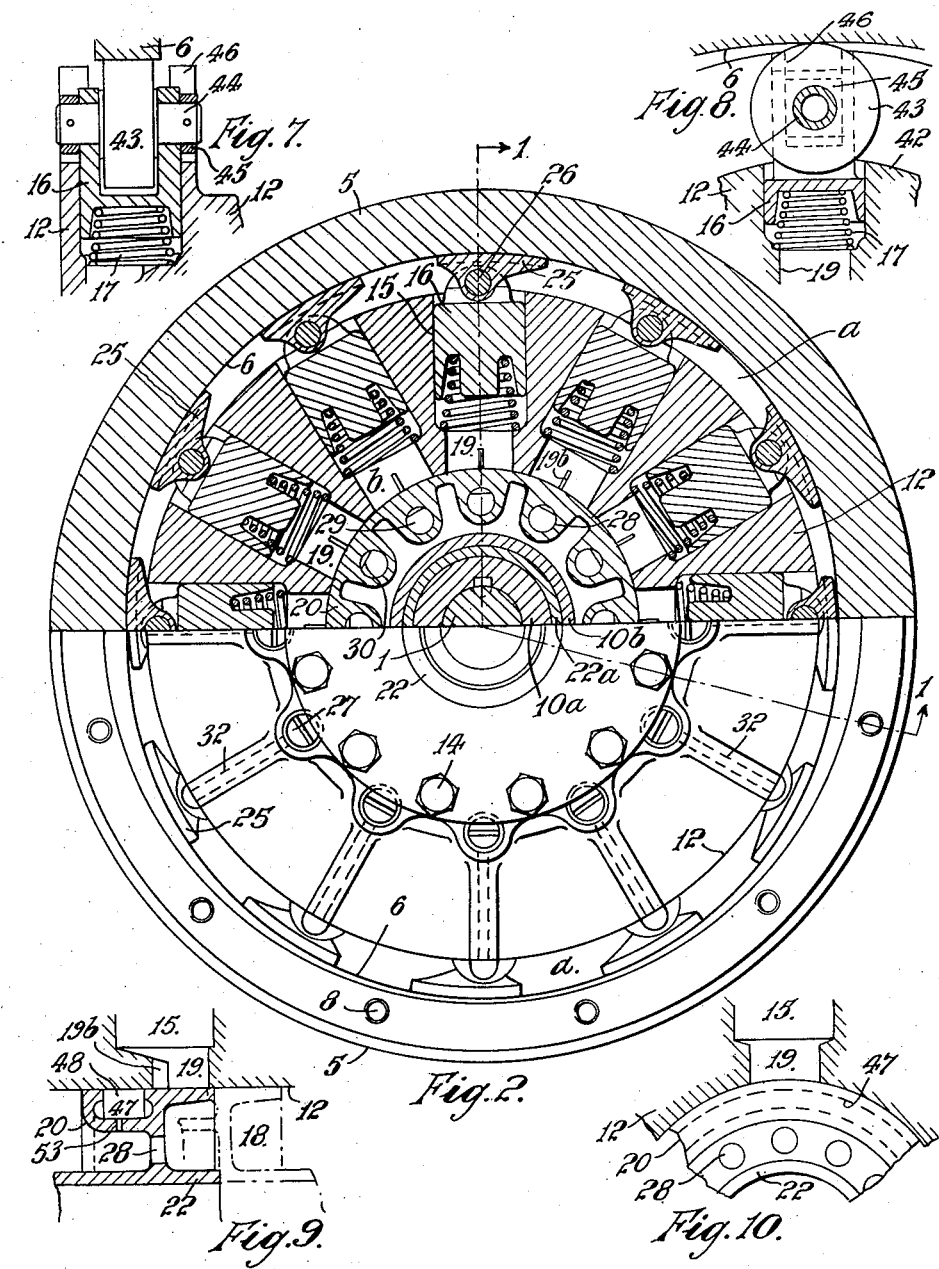
Inventor,
William Fraser
By Young, Emery & Thompson
Attys.

Patented Feb. 28, 1950

2,498,801

UNITED STATES PATENT OFFICE 2,498,801

TRANSVERSELY MOVABLE PISTON TYPE HYDRAULIC COUPLING

William Fraser, Ghyll Crest, Ghyll Head, Windermere, England

Application September 16, 1944, Serial No. 554,475
In Great Britain November 7, 1943

7 Claims. (Cl. 192—60)

This invention relates to improvements in hydraulic couplings of the type in which power is transmitted from one shaft or element to another shaft or element, comprising an outer casing on one shaft provided with a cam track adapted to reciprocate pistons in radially disposed cylinders in an inner casing on the other shaft, relative rotation between the shafts and their outer and inner casings causing a flow of fluid, such as oil, between the cylinders which is controllable by a valve to effect any desired impedance and consequent variation in the torque and speed transmitted from one to the other shaft.

According to this invention the hydraulic coupling comprises an outer casing on one shaft forming a fluid reservoir, a fluid pressure zone in an inner casing on the other shaft rotarily mounted in the outer casing and having radially disposed cylinders the pistons in which, during relative rotation of the casings, are reciprocated by a cam on the outer casing to set up a fluid flow between the cylinders through ports controlled by a valve, and a vent in or clearance around the control valve, its spindle, or an extension thereof, providing a relief duct adapted to permit small quantities of air and/or fluid to escape from the pressure zone into the reservoir. The invention also concerns further features in such couplings whereby a more efficient action is ensured.

In the accompanying explanatory drawings showing one embodiment of the invention:

Fig. 1 is a longitudinal section through the coupling on the line 1—1, Fig. 2.

Fig. 2 is an end view, the upper half in section on the line 2—2 of Fig. 1 while the lower half shows the interior of the coupling, the cover plate being removed.

Fig. 3 is a fragmentary section of a means for preventing turning of the pistons in the cylinders, and Fig. 4 is a section of a replenishment valve.

Fig. 5 being sections of spring-controlled air exit and inlet valves which may be provided on the outer casing.

Fig. 6 is a cross-section of a cylinder port to the valve chamber showing a preferred shape for effecting gradual cut-off.

Figs. 7 and 8 are fragmentary sections at right angles of an alternative construction enabling the pistons to be fitted with large rollers.

Figs. 9 and 10 are fragmentary sections at right angles showing a modified construction of the fluid flow control valve, and Fig. 11 is a section of a blow-off valve which may be fitted on the pressure zone.

The mechanism is capable of effective action when either of the shafts 1 or 2 is the driving shaft, but in the construction illustrated the shaft 2 is preferably the driving shaft and 1 the driven shaft, the shaft 2 carrying the outer casing formed by a side plate 3 bolted to the shaft 2 at 4, the plate having a cylindrical rim or flange 5 on the inner surface of which is an ovaloid cam track 6. A cover 7 bolted at 8 to the flange 5 encloses an outer low-pressure fluid reservoir $a$. The shaft 1 which is preferably the driven shaft rotates at one end in a bearing $1a$ and is keyed at 9 to the boss $10a$ of an end plate 10 bolted at 11 to an innner casing 12 having radial cylinders 15, the bore 18 of the casing being closed at the other side by an end plate 13 bolted to it at 14. Each of the radially disposed cylinders 15 is provided with a piston 16, the pistons preferably being spring loaded at 17. The bore 18 of the cylinder casing forms a valve chamber into which ports 19 open from the cylinders, and in the valve chamber 18 is slidably mounted a piston valve 20 for controlling the opening and closing of the ports 19. The valve may be urged to the port closing position by a spring 21 the valve spindle 22 being connected by a collar 23, slidable on the shaft 1, to an annular member 24 operated say in known manner by a fork, the valve operating spindle 22 sliding in bores in the end plate 13 and cover 7. The inner spaces in the cylinders 15, the ports 19, and the valve chamber 18 form an inner casing carried from the shaft 1 and constitute an enclosed pressure fluid zone $b$. The reciprocation of the pistons by the cam 6, as the inner casing rotates relatively to the outer casing, sets up a flow of fluid, such as oil, in the inner casing between the cylinders by way of the ports 19 and valve chamber 18, the flow being controlled to cause any desired impedance and so to vary the torque and speed transmitted from one shaft to the other by the movement of the control valve 20 varying the effective opening of the ports 19. The pistons 16 are preferably fitted with suitably shaped convex pads or slippers 25 mounted on pivots 26 in the outer ends of the pistons. To prevent turning of the pistons and so keep the slippers aligned in their path, the convex portion of each slipper in advance of the pivot 26 is of smaller size than the trailing portion, or longitudinal grooves 51, Figs. 1 and 3, are cut in the sides of the pistons engaged by studs 52 in the cylinder walls.

Apertures 28 are formed in the control valve 20 to permit fluid to pass from one side to the other as the valve moves and any desirable restriction of its closing movement may be effected by a disc 29, the diameter of its periphery 30, Fig. 2, being such that the disc does not entirely cover the apertures. The disc is spring-controlled at 30a to act in the manner of a dashpot masking the apertures, a ring 29a acting as a stop limiting the movement of the disc 29 under the action of the spring. To balance the hydraulic displacement of the control valve 20, its operating spindle 22 may be provided with an extension spindle 22a on the side opposite to, and of the same diameter as, the operating spindle 22, this extension spindle sliding in an annulus between the boss 10a and a sleeve 10b bolted to the plate 10. A clearance between the spindle 22 and the bore of the end plate 13 and/or between the valve spindle extension 22a and the sleeve 10b by way of apertures 22b in the end plate 10, or a vent 53 in the valve constitutes a relief duct or escape permitting exit from the valve chamber, being part of the pressure zone b, of any air and/or small quantities of fluid therefrom into the reservoir zone a.

For the purpose of maintaining a full charge of the operating fluid in the pressure zone constituted by the cylinders 15, their ports 19 and the valve chamber 18, non-return replenishment valves 31, Figs. 1 and 4, are provided opening into the cylinders from the reservoir zone. Any deficiency of fluid in the pressure zone, such as that resulting from the escape of air and/or fluid through the clearance duct around the valve spindle 22 or its extension 22a or from other leakage, can thus be made up. Such replenishment valves are preferably so arranged as to enable fluid to pass into the pressure zone from the reservoir at the minimum operational depth of fluid in the latter when in rotation. With this object ducts 32 may lead from the periphery of the cylinder casing or any inner radial position thereon to an annular recess 35 round each valve cage 33, retained by the plug 27, apertures 34 leading from this annulus to a space below the valve.

To permit a free flow of the working fluid between the cylinders when the control valve 20 is fully opened, it is desirable that the ports 19, Figs. 1 and 6, should be large in cross-section and with such large port openings, in order to provide control sensitivity and prevent shock arising from a too sudden closing of the control valve 20, the cut-off edge 19a of the port, Fig. 6, may be of tapered shape, and the port opening extended by a narrow ancillary prolongation 19b so as to extend the cut-off phase of the valve movement.

To prevent the pressure in the pressure zone of the coupling rising above some predetermined limit, one or more loaded safety valves 36, Fig. 11, may be fitted at any suitable position in the pressure zone adapted to open at the pressure for which the loading of the valves has been adjusted and pass fluid from the pressure zone into the reservoir. In the construction shown in Fig. 11 the valve is of the ball type controlled by a spring 37 the compression of which is adjustable by screwing the plug 38 in or out, a port 39 communicating with the pressure zone.

By providing the coupling with an enclosed pressure zone, to which the fluid flow set up by the pistons is confined, and a separate reservoir zone, isolated from the pressure zone and free of such fluid flow, turbulence of the fluid in the reservoir is avoided when the coupling is in operation, so that because of the centrifugal action and the different densities of air and oil therein, the oil will separate outwardly displacing the air towards the valve spindle 22. Provision may be made for permitting escape of such centrally disposed air from the coupling when in operation due to expansion of the fluid contents as the temperature rises, and if such means of escape is desired a spring-loaded relief valve 40, Figs. 1 and 5, may be fitted at some suitable position on the outer casing, which is adapted to open and permit air to escape. Another valve 41, Figs. 1 and 5, of reversed action, may also be provided to permit air being retaken into the coupling as its temperature falls.

In an alternative construction with rollers fitted to the pistons instead of slippers or pads, in order to accommodate rollers of large diameter and so reduce their rotational speed in relation to the shaft speed, the cylinder casing 12, Figs. 7 and 8, may be formed with a deep annular channel 42, in which the rollers 43 of larger diameter than the pistons may extend, the rollers being mounted on spindles 44 fitted with extensions and if desired cod pieces 45 slidable in radial slots 46 in the cylinder casing to maintain the rollers aligned in their path and take the side thrust on the pistons.

Instead of the fluid flow between the cylinders passing through the valve chamber 18, which then forms part of the pressure zone, as in the construction illustrated in Fig. 1, one or more internal passages 47, preferably annular, Figs. 9 and 10, may be formed in the body of the control valve 20 open by way of a port or ports 48 to the periphery of the valve, such ports cooperating with the ports 19 at the inner ends of the cylinders to control the masking of the latter ports, the valve chamber 18 in such case not being subject to the working pressure but forming part of the non-pressure zone, the pressure fluid flowing between the cylinders through the valve passages 47. With a control valve having such interior passages, a vent 53 may be provided on the body of the valve leading from the interior passages 47 forming part of the pressure zone to the valve chamber 18 and affording an escape of any air and/or small quantities of fluid into the valve chamber and so to the reservoir for ultimate return to the pressure zone by way of the non-return valves 31 on the cylinders. Alternatively, with such a valve the relief duct may be provided by a clearance between the valve periphery and the interior surface of the valve chamber 18 permitting the escape of air and/or small quantities of fluid into the valve chamber and thence to the reservoir.

Impellers 49, Fig. 1, may be provided projecting into the reservoir from the outer and/or inner casing, their disposition being such as to create or neutralize turbulence of the fluid in the reservoir or to assist in setting up an immediate centrifugal swirl.

The reservoir a is filled with oil from the inlet 50 in such quantity that the replenishment valves are flooded. When the coupling is in operation and the oil in the outer casing is tending to swirl centrifugally outward, the inner peripheral surface of the oil will lie radially inward of the replenishment valves 31 or their ducts 32 which are thus flooded and available for passing fluid from the reservoir into the cylinders to fill them and subsequently to replenish any loss occurring in the pressure zone $b$. When relative rotation between the inner and outer casing occurs, the slippers slide round the cam and the pistons reciprocate in the cylinders, causing a fluid flow between the cylinders which may be controlled by the valve 20 to vary the coupling grip between the driving and driven shafts.

A distinguishing feature of the invention is that any loss of working fluid from the pressure zone can only take place into the reservoir and subsequently be returned to the pressure zone by way of the replenishment valves 31, thus providing a complete and self-acting cycle of loss and return of working fluid.

I claim:

1. A hydraulic coupling for shafts or the like comprising an outer casing on one shaft forming a fluid reservoir, an inner casing on the other shaft rotarily mounted in the outer casing, a series of radially disposed cylinders and pistons in the inner casing forming an enclosed pressure fluid zone, a cam on the outer casing adapted during relative rotation of the casings to reciprocate the pistons and set up a fluid flow between the cylinders, a valve controlling such fluid flow, said valve having a vent therein providing a relief duct permitting small quantities of air and fluid to escape from the pressure zone into the reservoir, and apertures in said control valve permitting fluid to pass therethrough as the valve moves, and in which a disc is provided adapted to mask the apertures and retard its closing movement.

2. A hydraulic coupling for shafts or the like comprising a member on one shaft having a cam thereon, a casing on the other shaft rotarily mounted in said member and cam, a series of radially disposed cylinders and pistons in the casing forming an enclosed pressure fluid zone, said cam adapted during relative rotation of the member and casing to reciprocate the pistons and set up a fluid flow between the cylinders, and a valve controlling the fluid flow, said valve having apertures therein permitting fluid to pass therethrough as the valve moves and a disc adapted to mask the apertures and retard the closing movement of said valve.

3. A hydraulic coupling for shafts or the like comprising a member on one shaft having a cam thereon, a casing on the other shaft rotarily mounted in said member and cam, a series of radially disposed cylinders and pistons in the casing forming an enclosed pressure fluid zone, said cam adapted during relative rotation of the member and casing to reciprocate the pistons and set up a fluid flow between the cylinders, and a valve controlling such fluid flow, said valve having at least one annular passage around the external circumference of the valve through which the fluid flow between the cylinders takes place, an aperture therein permitting fluid to pass therethrough as the valve moves, and a vent in the wall of said annular passage providing a relief duct permitting small quantities of air and fluid to escape from the pressure zone.

4. A hydraulic coupling for shafts or the like comprising an outer casing on one shaft forming a fluid reservoir, an inner casing on the other shaft rotarily mounted in the outer casing, a series of radially disposed cylinders and pistons in the inner casing forming a pressure fluid zone, a cam on the outer casing adapted during relative rotation of the casings to reciprocate the pistons and set up fluid flow between the cylinders, a piston valve controlling such fluid flow, an operating spindle on the valve, and an extension spindle on the side opposite to and of the same external diameter as the operating spindle, said valve having apertures therein permitting fluid flow to pass therethrough as the valve moves, a disc adapted to mask the apertures and retard the closing movement of said valve, and a clearance around the extension spindle providing a relief duct permitting small quantities of air and fluid to escape from the pressure zone into the reservoir.

5. A hydraulic coupling for shafts or the like comprising an outer casing on one shaft forming a fluid reservoir, an inner casing on the other shaft rotarily mounted in the outer casing, a series of radially disposed cylinders and pistons in the inner casing forming a pressure fluid zone, a cam on the outer casing adapted during relative rotation of the casings to reciprocate the pistons and set up a fluid flow between the cylinders, a piston valve controlling such fluid flow, an operating spindle on the valve, and an extension spindle on the side opposite to and of the same external diameter as the operating spindle, said valve having apertures therein permitting fluid flow to pass therethrough as the valve moves, a disc adapted to mask the apertures and retard the closing movement of said valve, and a clearance around the operating spindle providing a relief duct permitting small quantities of air and fluid to escape from the presure zone into the reservoir.

6. A hydraulic coupling for shafts or the like comprising an outer casing on one shaft forming a fluid reservoir, an inner casing on the other shaft rotarily mounted in the outer casing, a series of radially disposed cylinders and pistons in the inner casing forming a pressure fluid zone, a cam on the outer casing adapted during relative rotation of the casings to reciprocate the pistons and set up a fluid flow between the cylinders, a piston valve controlling such fluid flow, said valve having apertures therein permitting fluid to pass therethrough as the valve moves and a disc adapted to mask the apertures and retard the closing movement of said valve, replenishment valves on the inner casing opening into the cylinders from the reservoir, and ducts leading from the circumferential periphery of the inner casing to the replenishment valve.

7. A hydraulic coupling for shafts or the like comprising an outer casing on one shaft, forming a fluid reservoir, an inner casing on the other shaft rotarily mounted in the outer casing, a series of radially disposed cylinders and pistons in the inner casing forming a pressure fluid zone, a cam on the outer casing adapted during relative rotation of the casings to reciprocate the pistons and set up a fluid flow between the cylinders, a piston valve controlling such fluid flow, said valve having apertures therein permitting fluid to pass therethrough as the valve moves and a disc adapted to mask the apertures and retard the closing movement of said valve, replenishment valves on the inner casing opening into the cylinders from the reservoir, ducts leading from the circumferential periphery of the inner casing to the replenishment valve, and a loaded valve on the outer casing permitting air escape from the coupling and another loaded valve on the outer casing permitting re-entry of air as the temperature of the fluid contents rises and falls.

WILLIAM FRASER.

REFERENCES CITED

The following references are of record in the file of this patent:

UNITED STATES PATENTS

| Number | Name | Date |
|---|---|---|
| 563,989 | Storey | July 14, 1896 |
| 809,331 | De Simone | Jan. 9, 1906 |
| 979,272 | Feller | Dec. 20, 1910 |
| 1,105,792 | Jessen | Aug. 4, 1914 |
| 1,436,753 | Carpenter | Nov. 28, 1922 |
| 1,567,912 | Carey | Dec. 29, 1925 |
| 1,609,429 | Rockwell | Dec. 7, 1926 |
| 1,840,161 | Graser | Jan. 5, 1932 |
| 2,204,261 | Fraser | June 11, 1940 |
| 2,293,693 | Wylie et al. | Aug. 18, 1942 |
| 2,329,230 | Thomas | Sept. 14, 1943 |